US008166495B2

(12) United States Patent
Kimura et al.

(10) Patent No.: US 8,166,495 B2
(45) Date of Patent: Apr. 24, 2012

(54) OPTICAL PICKUP

(75) Inventors: Katsuhiko Kimura, Kasumigaura (JP);
Hidenao Saito, Yokohama (JP); Jun Hato, Yokohama (JP); Takahiro Yamaguchi, Yokohama (JP)

(73) Assignee: Hitachi Media Electronics Co., Ltd., Iwate-ken (JP)

( * ) Notice: Subject to any disclaimer, the term of this patent is extended or adjusted under 35 U.S.C. 154(b) by 1085 days.

(21) Appl. No.: 11/668,098

(22) Filed: Jan. 29, 2007

(65) Prior Publication Data
US 2007/0274168 A1    Nov. 29, 2007

(30) Foreign Application Priority Data
May 24, 2006 (JP) .................................. 2006-143527

(51) Int. Cl.
*G11B 7/00* (2006.01)
(52) U.S. Cl. ...................................... 720/683; 369/44.15
(58) Field of Classification Search ............... 369/44.11, 369/44.14–44.16; 720/681–685
See application file for complete search history.

(56) References Cited

U.S. PATENT DOCUMENTS

| 4,462,096 A | * | 7/1984 | Kusaka ....................... 369/44.16 |
| 5,323,378 A | * | 6/1994 | Kim et al. ...................... 720/684 |
| 2002/0054559 A1 | * | 5/2002 | Choi ............................. 369/244 |
| 2002/0093888 A1 | | 7/2002 | Higashihara et al. |
| 2002/0105898 A1 | * | 8/2002 | Fujikawa ...................... 369/244 |

FOREIGN PATENT DOCUMENTS

| JP | 58182138 A | * | 10/1983 |
| JP | U 01-85915 | | 6/1989 |
| JP | 06020289 A | * | 1/1994 |
| JP | 2001-184683 | | 7/2001 |
| JP | 2002-260258 | | 9/2002 |
| JP | 2004-171662 | | 6/2004 |
| JP | 2005018864 A | * | 1/2005 |
| KR | 91-7820 | * | 5/1991 |

OTHER PUBLICATIONS

English translation of KR 91-7820.*
Machine Assisted Translation of JP 2005-018864 A.*
Translation of JP 58-182138 A.*
Machine-Assisted Translation of JP 06020289 A.*

* cited by examiner

*Primary Examiner* — Nathan Danielsen
(74) *Attorney, Agent, or Firm* — Antonelli, Terry, Stout & Kraus, LLP.

(57) ABSTRACT

An optical pickup in which the position of a magnet can be adjusted with respect to a yoke is provided. The optical pickup has an objective lens, a lens holder that holds the objective lens, a magnet disposed opposite to a side surface of the lens holder, and a yoke to the inside of which the magnet is attached. The yoke has an opening at least near the bottom of the magnet, through which the magnet can be visually observed from the outside of the yoke, the bottom being on the side of the yoke that is farther from an optical disc and the top being on the side of the yoke that is closer to the optical disc along the optical axis of the objective lens.

12 Claims, 7 Drawing Sheets

OPTICAL PICKUP

FIELD OF THE INVENTION

The present invention relates to an optical pickup provided in optical disc drives for reading information recorded on a recording surface of an optical disc or for recording information thereon.

BACKGROUND ART

A conventional objective lens driving means provided in the optical pickup of an optical disc drive is composed of a moving part on which an objective lens is mounted, supporting members for supporting the moving part, focusing coils, tracking coils, a yoke, and magnets.

When a drive current is applied to the focusing coils, electromagnetic force is produced by the interaction of the current with the magnetic flux developed by the magnets. The electromagnetic force drives the moving part in the focusing direction, which is either toward or away from the optical disc surface. Similarly, when a drive current is applied to the tracking coils, electromagnetic force is produced by the interaction of the current with the magnetic flux from the magnets. The electromagnetic force drives the moving part in the tracking direction, which is the direction radially with respect to the optical disc.

However, in cases in which inclination of the objective lens is caused when the moving part is moved in the focusing or tracking direction, optical aberration is generated, resulting in a possible adverse effect in recording/reading information on the optical disc. Thus, an objective lens driving means having small inclination when the moving part is moved is demanded.

Patent Document 1 discloses an example of a conventional structure of such objective lens driving means in the optical pickup. The publication discloses an example of such structure comprising a first yoke and a second yoke to which magnets are attached, so that the position of the second yoke with respect to that of the first yoke can be adjusted in the tracking direction. The publication discloses that the inclination of the moving part caused when the center of a magnetic circuit and that of the moving part are shifted due to dimension errors or fabrication errors in parts can be suppressed. See JP Patent Publication (Kokai) No. 2001-184683 A (page 5, FIG. 2)

SUMMARY OF THE INVENTION

In the above publication, while the position of the second yoke is adjusted, alternatively, the adjustment of the positions of the magnets with respect to a yoke can be conceivable as another solution.

The present provides an optical pickup in which the positions of the magnets can be adjusted with respect to the yoke.

The present invention is structured as follows. Namely, an optical pickup according to the present invention comprises an objective lens, a lens holder that holds the objective lens, a magnet disposed opposite to a side surface of the lens holder, and a yoke to the inside of which the magnet is attached. The yoke has an opening at least near the bottom of the magnet, and through the opening, the magnet can be visually observed from the outside of the yoke, the bottom being on the side of the yoke that is farther from an optical disc, and the top being on the side of the yoke that is closer to the optical disc along the optical axis of the objective lens.

In accordance with the present invention, jigs that sandwich the magnet are inserted through the openings of the yoke and the cover disposed near the top and bottom of the magnet, and thus, the position of the magnet can be adjusted along the optical axis of the objective lens, depending on the inclination of the moving part with respect to the magnet. Thus, since the moment generated by the coils upon movement of the moving part can be reduced, it is possible to provide an optical pickup having an objective lens with small inclination and to accurately record or read information on an optical disc.

DESCRIPTION OF PREFERRED EMBODIMENTS OF THE INVENTION

Embodiment 1

An embodiment of the optical pickup according to the invention will be described with reference to the drawings.

Figure 8:
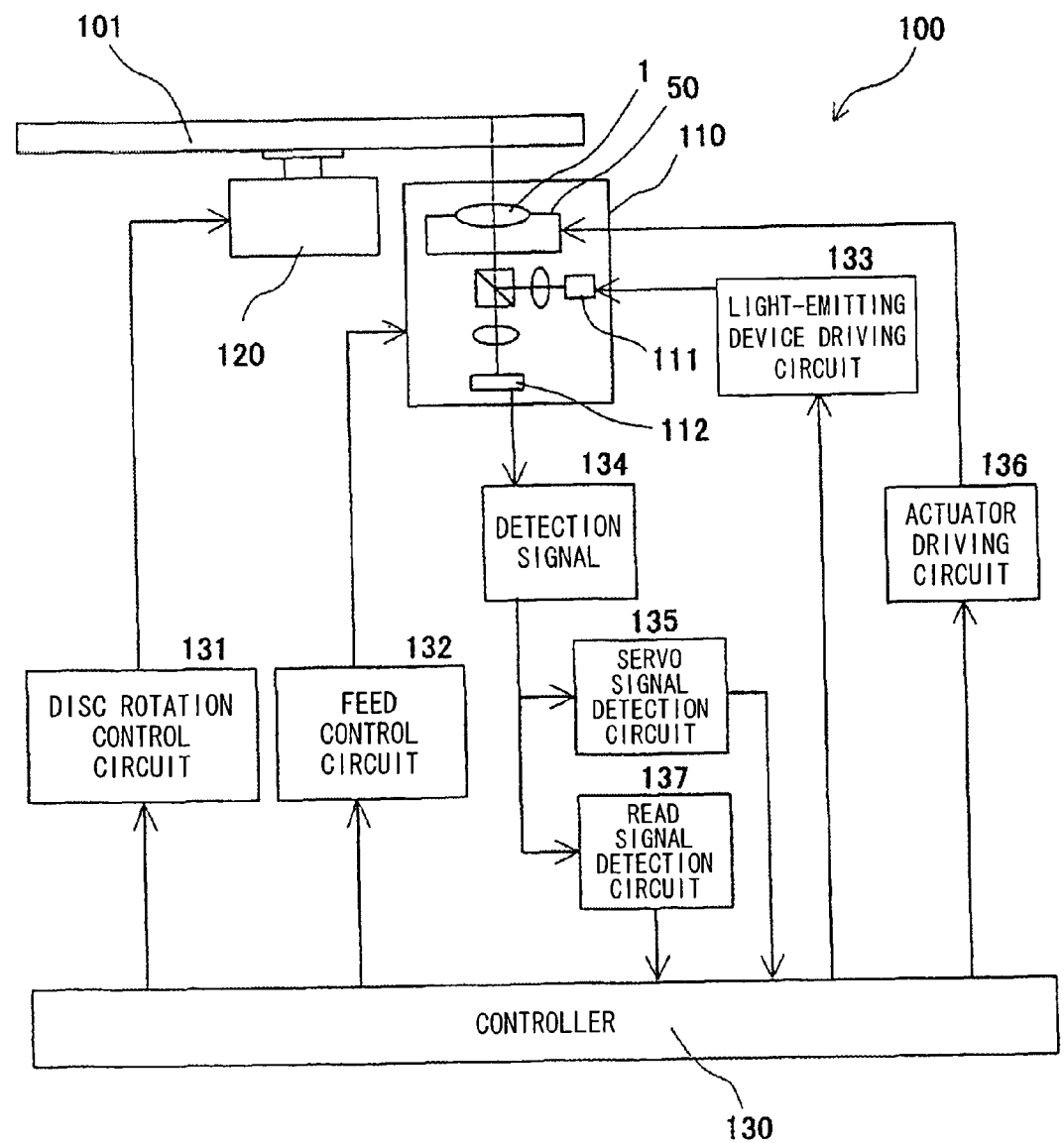
FIG. 8 shows a block diagram of an embodiment of an optical disc drive according to the present invention.

Initially, an optical disc drive 100 in which an optical pickup 110 is mounted is described with respect to a block diagram of FIG. 8. The optical disc drive 100 comprises a spindle motor 120 for rotating an optical disc 101, an optical pickup 110 for reading or writing information on the optical disc 101, and a controller 130 for controlling these components. The optical pickup 110 comprises an objective lens driving means 50, of which the details will be described later, and optical components such as a laser light emitting device 111.

A disc rotation control circuit 131, which is connected to the controller 130, receives an instruction therefrom and drives the spindle motor 120 on which the optical disc 101 is mounted. A feed control circuit 132, which is also connected to the controller 130, receives an instruction therefrom and causes the optical pickup 110 to be moved radially with respect to the optical disc 101.

To the laser light emitting device 111 mounted on the optical pickup 110, a light-emitting device driving circuit 133 is connected. Upon instruction from the controller 130, the light-emitting device driving circuit 133 sends a drive signal to the laser light emitting device 111, which then emits laser light. The laser light is focused by an objective lens 1 on the optical disc 101. The thus focused laser light is reflected by the optical disc 101. The reflected light passes through the objective lens 1 and then becomes incident on a photodetector 112, which produces a detection signal 134. The detection signal 134 is sent to a servo signal detection circuit 135 and a read signal detection circuit 137. Based on the detection signal 134 sent to the servo signal detection circuit 135, a servo signal is produced and fed to an actuator driving circuit 136.

The actuator driving circuit 136 feeds a drive signal to the objective lens driving means 50 of the optical pickup so as to control the positioning of the objective lens 1.

On the other hand, based on the detection signal 134 fed to the read signal detection circuit 137, a read signal is produced, with which the information recorded in the optical disc 101 can be reproduced.

In the following, the details of the objective lens driving means 50 provided in the optical pickup 110 shown in FIG. 8 will be described.

Figure 1:
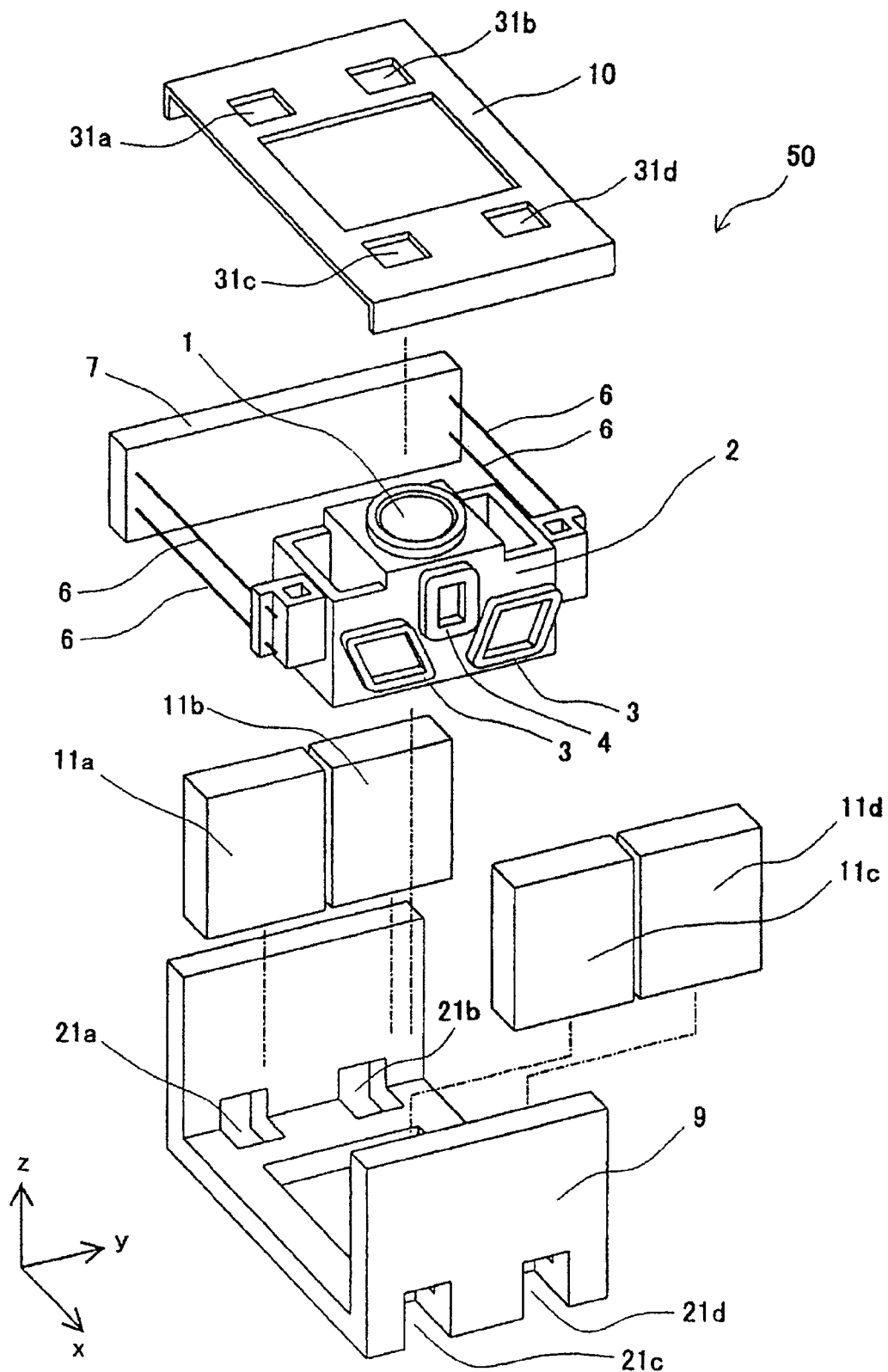
FIG. 1 shows an embodiment of an objective lens driving means in an optical pickup according to the present invention.

FIG. 1 shows an exploded perspective view of the objective lens driving means 50 in the optical pickup 110 according to the present invention. In the figure, the z-direction corresponds to the focusing direction in which the objective lens 1 is moved toward or away from the optical disc surface along the optical axis of the objective lens 1. The y-direction corresponds to the tracking direction in which the objective lens 1 is moved radially with respect to the optical disc. The direction perpendicular to both the y-direction and the z-direction is referred to as the x-direction. Along the optical axis of the objective lens 1, which corresponds to the z-direction, the direction in which the objective lens 1 is moved closer to the optical disc is considered to be top, and the direction in which the objective lens 1 is moved farther from the optical disc is considered to be the bottom.

The objective lens 1 is mounted on the upper surface of a lens holder 2. A pair of focusing coils 3 that generate driving force in the focusing direction and a tracking coil 4 that generates driving force in the tracking direction are attached to either side of the lens holder 2 that is parallel to the focusing direction and the tracking direction.

One end of each of the supporting members 6 is fixed to the lens holder 2, while the other end thereof is fixed to a fixing portion 7. The moving part comprising the objective lens 1, the lens holder 2, the focusing coils 3, and the tracking coils 4 is movably supported by the fixing portion 7 via the supporting members 6. The focusing coils 3 and the tracking coils 4 are electrically connected to one end of the support members 6 by soldering, for example.

Magnets 11*a*, 11*b*, 11*c*, and 11*d* are attached on the inside of a magnetic yoke 9, so that the magnets are opposite to the sides of the lens holder 2 parallel to the focusing direction and the tracking direction and the magnets are spaced apart from the focusing coils and the tracking coils. Each of the magnets 11*a*, 11*b*, 11*c*, and 11*d* is magnetized with two poles, and two of the magnets are disposed in parallel to each other, so that the two magnets are opposite to the one of the above sides of the lens holder 2.

While a gap between two magnets is illustrated in FIG. 1 so as to easily explain that the two magnets 11*a* and 11*b* or the two magnets 11*c* and 11*d* are disposed in parallel to each other on either side of the lens holder 2, such gap is not necessarily needed; two magnets may be in contact with each other.

The yoke 9 has openings 21*a*, 21*b*, 21*c*, and 21*d*, through which the magnets can be visually observed from the outside of the yoke 9, each opening being near the center bottom of each of the four magnets. Each of the openings 21*a*, 21*b*, 21*c*, and 21*d* is substantially L-shaped, extending from a space in the bottom surface of the yoke 9 below the bottom of each of the magnets to a space in a side surface of the yoke 9 to which the magnet is attached.

A cover 10 is disposed above the moving part, and folded end portions are attached to the yoke 9. The cover 10 has openings 31*a*, 31*b*, 31*c*, and 31*d*, through which the magnets can be visually observed from the outside of the cover 10, each opening being above the center of each of the four magnets.

Figure 2:
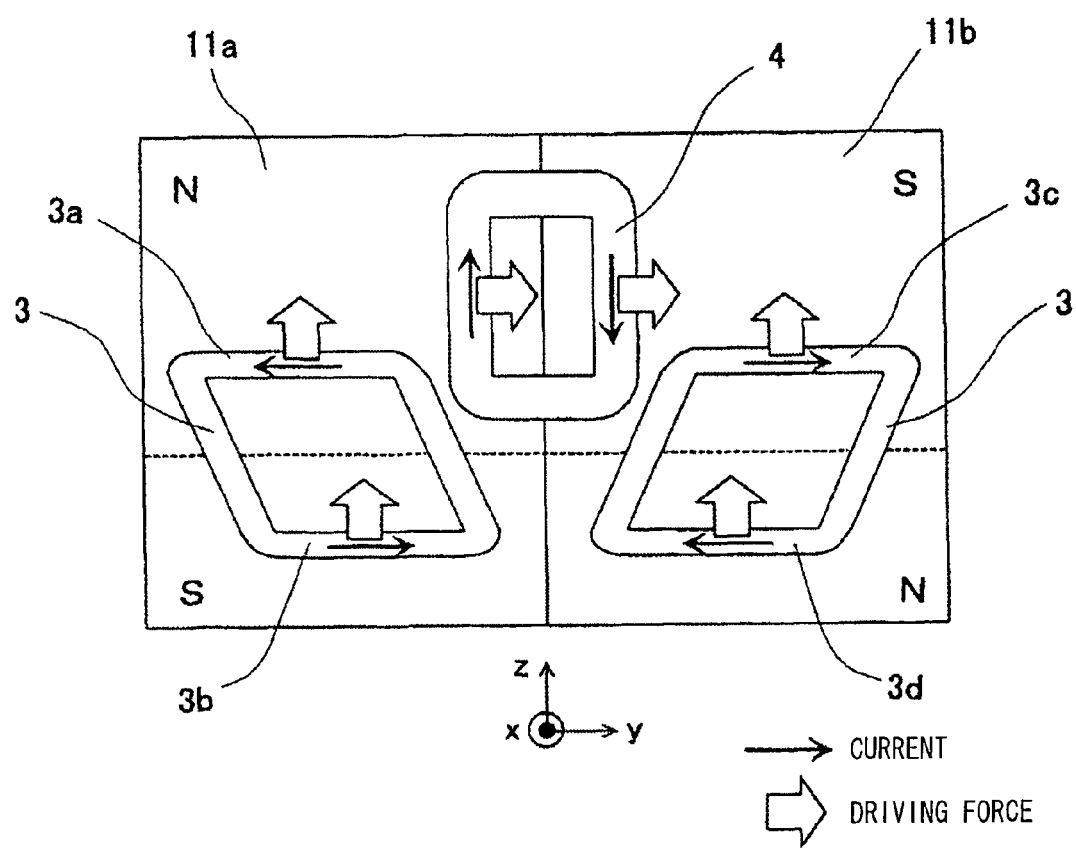
FIG. 2 shows an arrangement of coils and magnets in cases in which there are no fabrication errors in the objective lens driving means shown in FIG. 1.

FIG. 2 shows an arrangement of the focusing coils 3, the tracking coil 4, and the magnets 11*a* and 11*b* on one of the above sides of the lens holder 2, in cases in which there are no fabrication errors. Note that the figure shows only the focusing coils 3, the tracking coil 4, and the magnets 11*a* and 11*b* to facilitate explanation. Further, the same structure applies to the other side of the lens holder 2.

Each of the magnets 11*a* and 11*b* has two poles, and the magnets are arranged so that different poles are adjacent to each other. Each of the pair of focusing coils 3 has either coil wire portions 3*a* and 3*b* or 3*c* and 3*d* that generate driving force in the focusing direction, and each of the pair of focusing coils is disposed over the magnetic pole boundary line of the magnet 11*a* or 11*b*. Further, the pair of focusing coils 3 are disposed axisymmetric with respect to the boundary between the magnets 11*a* and 11*b*. The tracking coil 4 is disposed over the boundary between the magnets 11*a* and 11*b*.

Based on such structure, when the magnetic poles on the surface of the magnets 11*a* and 11*b* are caused to have the polarities shown in FIG. 2, and currents are caused to flow through the focusing coils 3 and the tracking coil 4 in directions indicated by the arrows, driving force in the focusing direction and driving force in the tracking direction can be obtained.

In cases in which there are no fabrication errors, since the pair of focusing coils 3 are disposed axisymmetric with respect to the boundary between the magnets 11*a* and 11*b*, the driving force generated by the coil wire portions 3*a* and 3*b* on the left and the driving force generated by the coil wire portions 3*c* and 3*d* on the right are equal, and therefore, the moment with respect to the center of the focusing coils 3 is not generated.

Next, cases in which the moving part is obliquely assembled with respect to the magnets due to fabrication errors will be described.

Figure 3:
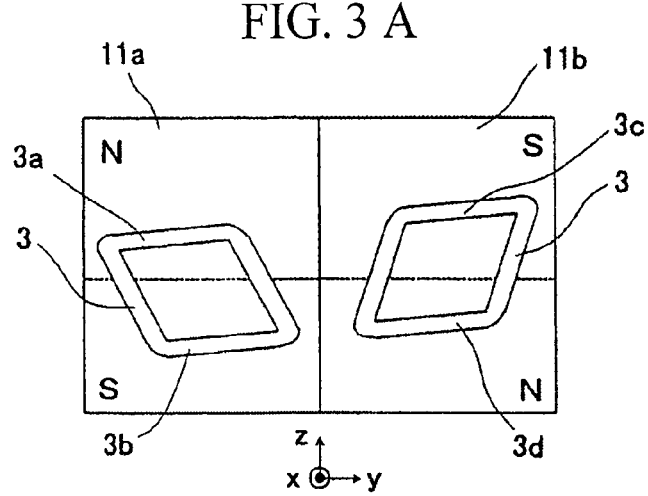
FIG. 3 shows driving force generated by focusing coils in cases in which a moving part of the objective lens driving means shown in FIG. 1 is obliquely assembled.
Figure 3:
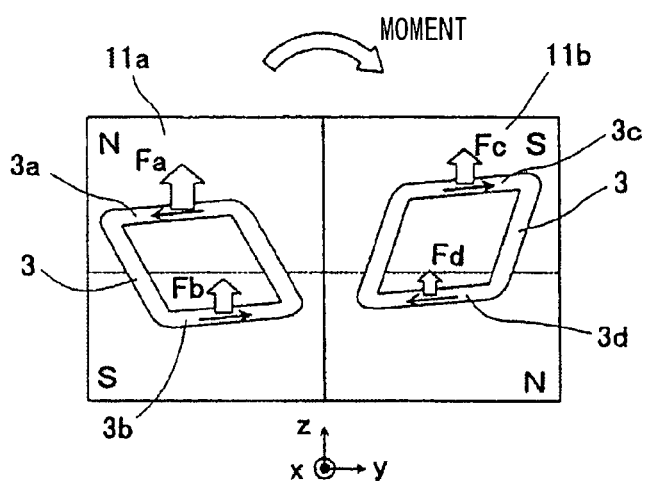
Figure 3:
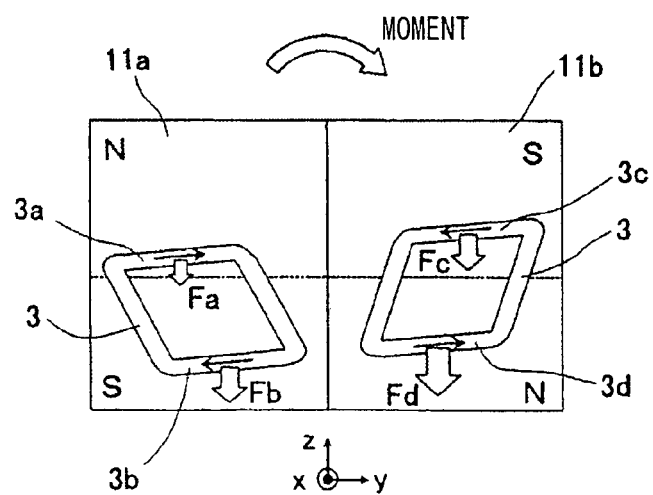

FIG. 3 shows an arrangement of the focusing coils 3 and the magnets 11*a* and 11*b* when the moving part rotates around the x-axis. FIG. 3(*a*) shows an example in which the coil wire portions 3*a* and 3*b* of the focusing coils 3 are shifted downward in the z-direction while the coil wire portions 3*c* and 3*d* are shifted upward in the z-direction, even in a neutral state where currents are not caused to flow through the focusing coils 3. FIG. 3(*b*) shows a case in which the focusing coils 3 are moved upward in the focusing direction from the neutral state, and FIG. 3(*c*) shows a case in which the focusing coils 3 are moved downward in the focusing direction from the neutral state.

In FIG. 3(*b*), since the coil wire portions 3*c* and 3*d* originally shifted upward in the z-direction are shifted further upward in the z-direction, the coil wire portions 3*c* and 3*d* are caused to be moved further away from the center of the magnetic poles of the magnet to which the coil wire portions 3*c* and 3*d* are opposite, as compared with the coil wire portions 3*a* and 3*b*. Thus, driving force Fc and Fd generated by the coil wire portions 3*c* and 3*d* become smaller than driving force Fa and Fb generated by the coil wire portions 3*a* and 3*b*. As a result, the moment about the x-axis is generated with respect to the center of the focusing coils 3.

In FIG. 3(c), since the coil wire portions 3a and 3b originally shifted downward along the z-axis is shifted further downward along the z-axis, the coil wire portions 3a and 3b are caused to be moved further away from the center of the magnetic poles of the magnet to which the coil wire portions 3a and 3b are opposite, as compared with the coil wire portions 3c and 3d. Thus, driving force Fa and Fb generated by the coil wire portions 3a and 3b become smaller than driving force Fc and Fd generated by the coil wire portions 3c and 3d. As a result, the moment about the x-axis is generated with respect to the center of the focusing coils 3.

In the present embodiment, since the yoke 9 has the openings 21a, 21b, 21c, and 21d near the bottom of the magnets 11a, 11b, 11c, and 11d, and the cover 10 has the openings 31a, 31b, 31c, and 31d above the magnets 11a, 11b, 11c, and 11d, jigs for sandwiching each magnet can be inserted through these openings, whereby the position of each magnet can be vertically adjusted, depending on inclination of the moving part.

Figure 4:
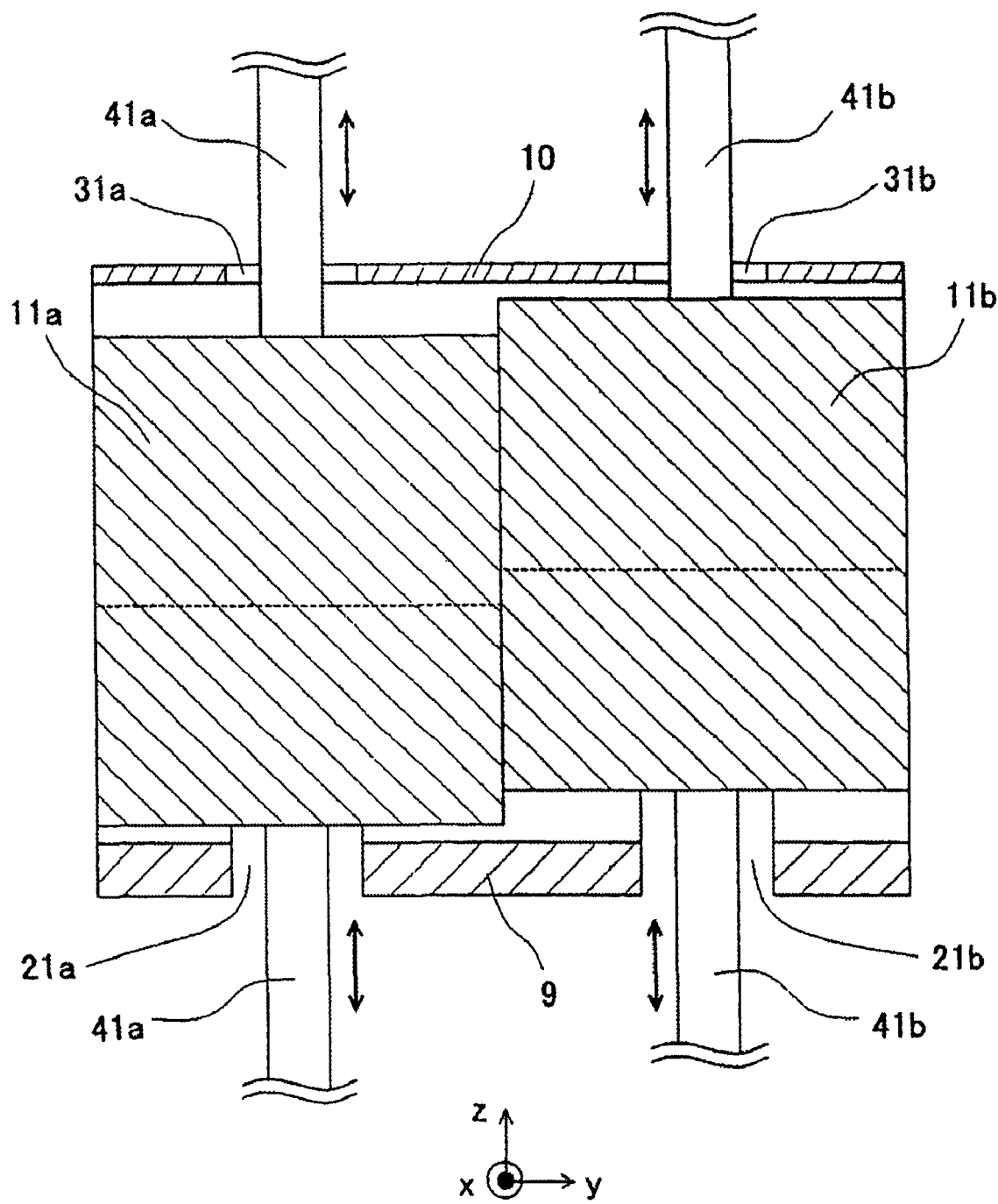
FIG. 4 shows a positional adjustment of the magnets of the objective lens driving means shown in FIG. 1.

FIG. 4 shows a method for vertically adjusting the positions of the magnets. FIG. 4 shows a cross-sectional view parallel to the y-z plane of the magnets 11a and 11b at the openings 21a, 21b, 31a, and 31b. Note that the cross-sectional view is the same as that of the magnets 11c and 11d, and the openings 21c, 21d, 31c, and 31d.

Non-magnetic, rod-like jigs 41a and 41b are inserted into the openings 31a and 31b of the cover 10 and the openings 21a and 21b of the yoke 9 from above and below the magnets 11a and 11b, which are thus supported by being sandwiched from above and below. By vertically moving the individual jigs 41a and 41b, the position of each of the magnets 11a and 11b can be vertically adjusted.

Figure 5:
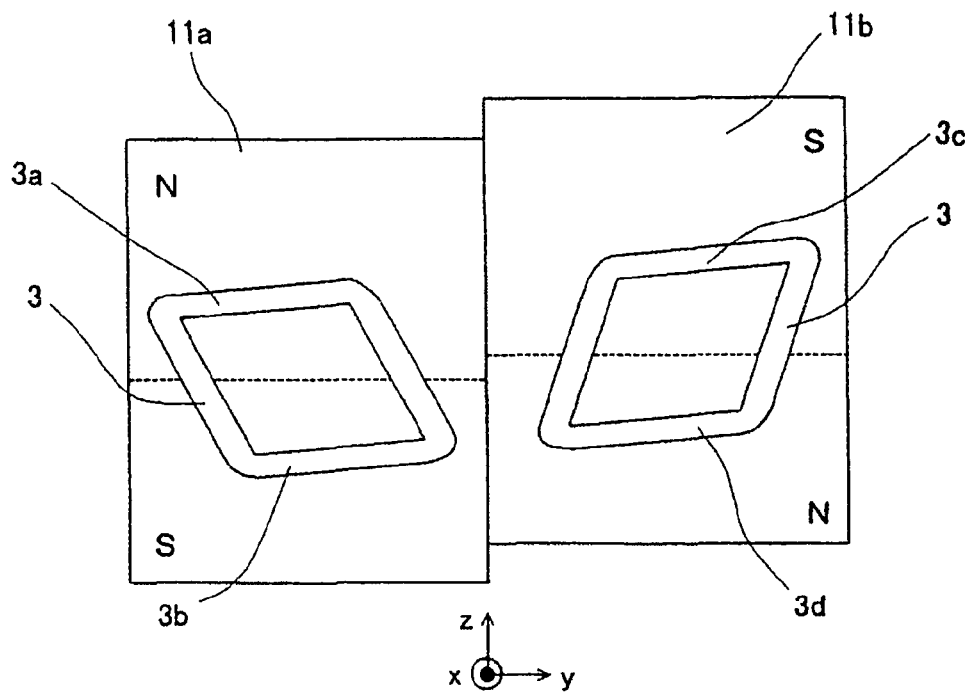
FIG. 5 shows an arrangement of the focusing coils and magnets after the positional adjustment of the magnets of the objective lens driving means shown in FIG. 1 is completed.

For example, as shown in FIG. 5, in cases in which the moving part is obliquely assembled in such a manner that the coil wire portions 3a and 3b of the focusing coils 3 are shifted downward in the z-direction, and the coil wire portions 3c and 3d are shifted upward in the z-direction, the magnet 11a opposite to the coil wire portions 3a and 3b is moved downward in the z-direction, and the magnet 11b opposite to the coil wire portions 3c and 3d is moved upward in the z-direction. In this way, it is possible to bring the position of the magnetic poles of each magnet to close to be symmetrical with respect to the left or right coil wire portions. Thus, since the driving force generated by the left coil wire portions 3a and 3b is made approximately equal to the driving force generated by the right coil wire portions 3c and 3d, the moment about the center of the focusing coils 3 can be reduced.

Since the jigs 41a and 41b are made of nonmagnetic material, even when the jigs 41a and 41b are brought closer to the magnets 11a and 11b, the jigs are not subjected to the magnetic force, whereby the operation can be carried out at ease.

Further, since each of the openings 21a and 21b of the yoke 9 and each of the openings 31a and 31b of the cover 10 are near the center of each of the magnets 11a and 11b to which the openings are opposite, the center of the magnet 11a or 11b can be supported by the jig 41a or 41b, whereby the position of each of the magnets can be stably adjusted.

Figure 6:
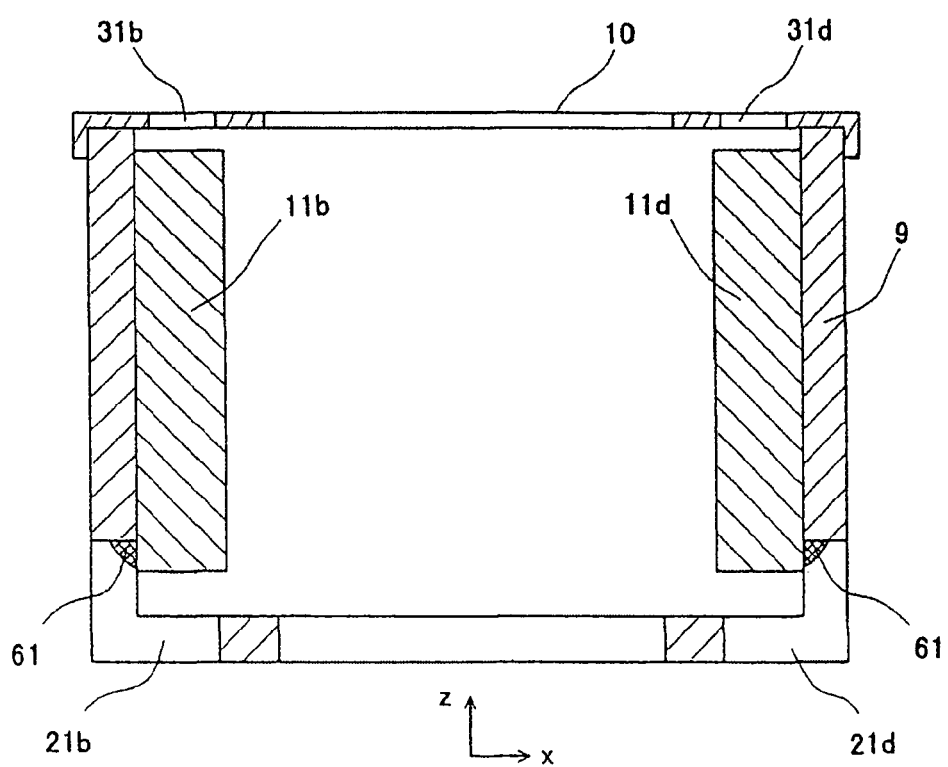
FIG. 6 shows a cross-sectional view of a yoke, a cover, and the magnets of the objective lens driving means shown in FIG. 1.

FIG. 6 shows a cross-sectional view parallel to the x-z plane of the magnets 11b and 11d at the openings 21b, 21d, 31b, and 31d. For ease of explanation, the figure shows only the yoke 9, the cover 10, and the magnets 11b and 11d. Note that the cross-sectional view is the same as that of the magnets 11a and 11c, and the openings 21a, 21c, 31a, and 31c.

The openings 21b and 21d in the yoke 9 each are substantially L-shaped, extending from portions in the bottom surface of the yoke 9 near the bottom of the magnet 11b and 11d to portions in the side surfaces of the yoke 9 to which the magnets are attached. The upper end of each of the openings 21b and 21d is higher than the lower end of each of the magnets 11b and 11d.

Upon completion of the above positional adjustment of the magnets, an adhesive 61 is applied to the boundary portion between each of the magnets 11b and 11d and the yoke 9 through the substantially L-shaped openings 21b and 21d in the yoke 9, so as to fix the magnets 11b and 11d to the yoke 9.

Since each of the openings 21b and 21d in the yoke 9 is formed to be substantially L-shaped so that the lower end of each of the magnets is exposed from the bottom surface of the yoke 9, it is easy to apply the adhesive 61 to the boundary portion between each of the magnets 11b and 11d and the yoke 9. Thus, the magnets 11b and 11d can be fixed to the yoke 9 without fail.

In order to carry out the above positional adjustment of the magnets, inclination of the objective lens caused when the moving part is moved upon application of a current through the focusing coils 3 is observed with an auto-collimator or the like, and while observing the inclination, each magnet is adjusted such that the inclination becomes minimum. Alternatively, an amount of adjustment of each magnet is set by measuring the relative position of the moving part with respect to a reference, and correcting the amount of shift.

Figure 7:
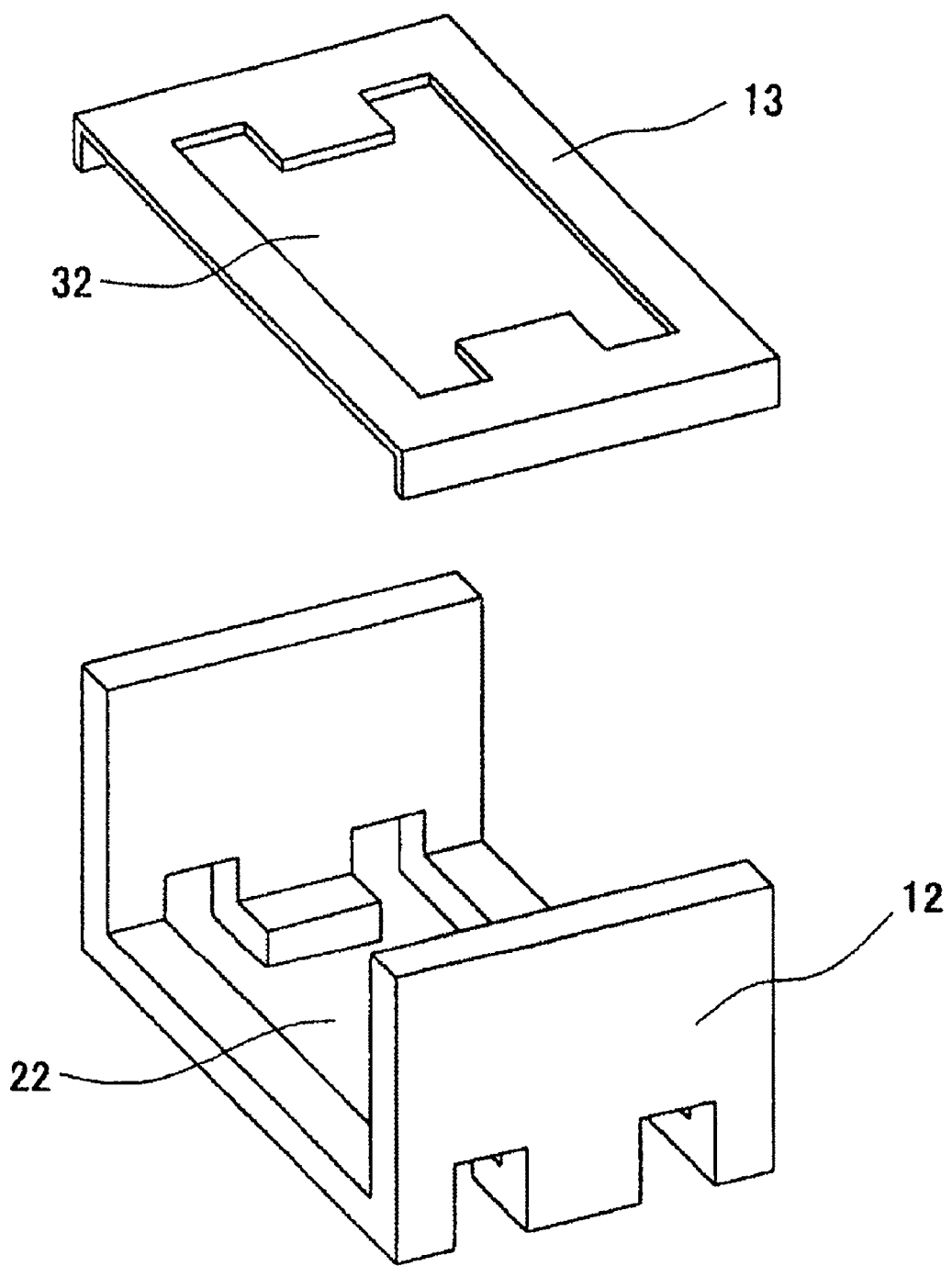
FIG. 7 shows a yoke and a cover of the objective lens driving means structured in another way according to the present invention.

Note that while the openings 21a, 21b, 21c, and 21d in the yoke 9 and the openings 31a, 31b, 31c, and 31d in the cover 10 each are shown as independent openings in the present embodiment, because it is only necessary that the jigs sandwiching the magnets pass through these openings, each of the openings does not necessarily form an independent opening. As shown in FIG. 7, the openings in the yoke 12 and the openings in the cover 13 may form individual openings 22 and 32, respectively.

Meanwhile, the yoke 9 to which the magnets 11a, 11b, 11c, and 11d are attached needs to be made of magnetic material. However, the cover 10 may be made of magnetic or non-magnetic material. When the cover 10 is non-magnetic, since the magnetic field is constant irrespective of the presence or absence of the cover 10, it is possible to make the positional adjustment of each magnet without the cover 10 and attach the cover 10 afterward. In such case, the cover 10 may not be provided with the openings 31a, 31b, 31c, and 31d through which jigs are inserted; it is only necessary to provide the yoke 9 with the openings 21a, 21b, 21c, and 21d.

Thus, in accordance with the optical pickup of the present invention, even when the moving part is obliquely assembled with respect to the magnets due to fabrication errors or the like, since the position of each of the magnets can be adjusted along the optical axis of the objective lens, the moment generated by the focusing coils can be reduced, and an optical pickup having an objective lens with small inclination can be obtained, whereby it becomes possible to accurately record or read information on an optical disc.

INDUSTRIAL APPLICABILITY

The present invention can be used as an optical pickup in an optical disc drive.

The invention claimed is:
1. An optical pickup, comprising:
an objective lens;
a lens holder that holds the objective lens;
at least one magnet disposed opposite to a side surface of the lens holder;

a yoke having a bottom surface and at least one side surface, the at least one magnet being attached to an inside surface of the at least one side surface; and a cover attached to a top of the yoke;

wherein the yoke has portions surrounding at least one opening extending therethrough which is positioned at least at the bottom surface of the yoke, the at least one opening of the yoke being positioned opposite a bottom surface of the at least one magnet in a direction parallel with an optical axis of the objective lens;

wherein the bottom surface of the at least one magnet is visually observable through the at least one opening of the yoke from outside of the yoke in the direction parallel with the optical axis of the objective lens;

wherein the cover has portions surrounding at least one opening extending therethrough, the at least one opening of the cover being positioned opposite a top surface of the at least one magnet in the direction parallel with the optical axis of the objective lens;

wherein the top surface of the at least one magnet is visually observable through the at least one opening of the cover from outside of the cover in the direction parallel with the optical axis of the objective lens; and wherein each of the at least one opening of the yoke and the at least one opening of the cover enables a jig to be inserted therethrough, the jig being adapted to sandwich the at least one magnet from opposite sides thereof and to adjust a position of the at least one magnet.

2. The optical pickup according to claim 1, wherein the at least one opening of the yoke is substantially L-shaped, extending from a portion in the bottom surface of the yoke to a portion in the at least one side surface to which the at least one magnet is attached.

3. The optical pickup according to claim 2, wherein the at least one magnet is fixedly attached to the yoke by applying an adhesive to a back surface of the at least one magnet at the substantially L-shaped opening provided in the yoke.

4. The optical pickup according to claim 1, wherein a center portion of at least one of the bottom surface and the top surface of the at least one magnet is positioned with respect to at least one of the at least one opening of the yoke and the at least one opening of the cover.

5. The optical pickup according to claim 1, wherein the at least one magnet has a rectangular shape.

6. An optical pickup, comprising:
an objective lens;
a lens holder that holds the objective lens;
two magnets disposed parallel to each other opposite to one side of the lens holder;
a yoke having a bottom surface and at least one side surface, the two magnets being attached to an inside surface of the at least one side surface;
a cover attached to a top of the yoke; and wherein the yoke has portions surrounding at least one opening extending therethrough which is positioned at least at the bottom surface of the yoke, the at least one opening of the yoke being positioned opposite a bottom surface of the two magnets in a direction parallel with an optical axis off the objective lens;

wherein a bottom surface of each of the two magnets is visually observable through the at least one opening of the yoke from outside of the yoke in the direction parallel with the optical axis of the objective lens;

wherein the cover has portions surrounding at least one opening extending therethrough, the at least one opening of the cover being positioned opposite a top surface of the two magnets in the direction parallel with the optical axis of the objective lens;

wherein the top surface of the two magnets is visually observable through the at least one opening of the cover from outside of the cover in the direction parallel with the optical axis of the objective lens; and wherein each of the at least one opening of the yoke and the at least one opening of the cover enables a jig to be inserted therethrough, the jig being adapted to sandwich the two magnets from opposite sides thereof and to adjust a position of the two magnets.

7. The optical pickup according to claim 6, wherein the at least one opening of the yoke is substantially L-shaped, extending from a portion in the bottom surface of the yoke to a portion in the at least one side surface to which the two magnets are attached.

8. The optical pickup according to claim 6, wherein the two magnets are fixedly attached to the yoke by applying an adhesive to a back surface of each of the two magnets at the substantially L-shaped opening provided in the yoke.

9. The optical pickup according to claim 6, wherein a center portion of the bottom surface of each of the two magnets is positioned with respect to the at least one opening of the yoke.

10. The optical pickup according to claim 9, wherein two openings are provided at least at the bottom surface of the yoke and the center portion of the bottom surface of a respective one of the two magnets is positioned with respect to a respective one of the two openings at the bottom surface of the yoke.

11. The optical pickup according to claim 6, wherein each of the two magnets has a rectangular shape.

12. The optical pickup according to claim 6, wherein the yoke and the cover have two openings corresponding to the bottom surfaces and top surfaces of the two magnets, respectively.

* * * * *